United States Patent [19]

Iwasaki et al.

[11] Patent Number: 4,988,328
[45] Date of Patent: Jan. 29, 1991

[54] BICYCLE MULTIPLE CHAINWHEEL

[75] Inventors: Yoshihisa Iwasaki; Jun Kobayashi, both of Sakai, Japan

[73] Assignee: Maeda Industries, Ltd., Osaka, Japan

[21] Appl. No.: 488,121

[22] Filed: Mar. 5, 1990

[30] Foreign Application Priority Data

Mar. 6, 1989 [JP] Japan ............................. 1-25407[U]
Mar. 6, 1989 [JP] Japan ............................. 1-25408[U]

[51] Int. Cl.5 ............................................. F16H 55/30
[52] U.S. Cl. ................................. 474/160; 74/594.2
[58] Field of Search ................. 474/78, 152, 158, 160, 474/164; 74/448, 594, 594.1, 594.2; 280/259-261

[56] References Cited

U.S. PATENT DOCUMENTS

| 3,550,465 | 12/1970 | Maeda | 474/160 X |
| 4,198,876 | 4/1980 | Nagano | 474/160 |
| 4,259,880 | 4/1981 | Ueno | 74/594.2 |
| 4,439,172 | 3/1984 | Segawa | 474/160 |
| 4,598,608 | 7/1986 | Ueno | 74/594.2 |
| 4,642,075 | 2/1987 | Nagashima | 474/160 |
| 4,741,724 | 5/1988 | Wang | 474/160 |

FOREIGN PATENT DOCUMENTS 704207 2/1954 United Kingdom ............... 474/160

Primary Examiner—Thuy M. Bui
Attorney, Agent, or Firm—William H. Eilberg

[57] ABSTRACT

The present invention provides a bicycle multiple chainwheel to be mounted on a pedalling crank assembly. The chainwheel, which is held in driving engagement with a chain, comprises a larger sprocket and at least one smaller sprocket coaxial with the larger sprocket. When shifting the chain from the larger sprocket to the smaller sprocket, the chain normally starts disengaging from the larger sprocket at one of specific circumferential positions thereof. In view of this, the larger sprocket is made to have local chain guide portions only at those positions necessary for preventing the thus disengaged chain from being trapped in an axial gap between the larger and smaller sprockets.

11 Claims, 5 Drawing Sheets

BICYCLE MULTIPLE CHAINWHEEL

BACKGROUND OF THE INVENTION

1. Field of the Invention

This invention relates generally to a bicycle multiple chainwheel which includes at least two diametrically different sprockets. More particularly, the present invention relates to a bicycle multiple chainwheel which is improved to provide reliable chain shifting from a larger sprocket to a smaller sprocket.

2. Description of the Prior Art

As is well known, a bicycle is driven by a combination of a front gear and a rear gear connected thereto by a chain. The front gear is normally called "chainwheel", whereas the rear gear is usually referred to as "freewheel". The chainwheel is mounted on a pedalling crank assembly, and a forward pedalling force is transmitted to the freewheel through the chain for driving the rear wheel.

In such a bicycle, when the freewheel includes two or more diametrically different sprockets, it is possible to provide two or more speeds by shifting the chain from one sprocket to another. Further, if the chainwheel also includes two or more diametrically different sprockets, it becomes possible to provide an additionally increased number of speeds. For example, when the chainwheel consists of three sprockets with the freewheel comprising five sprockets, the cyclist can select 15 speeds in total.

The multiple chainwheel comprises a larger sprocket located at a laterally outermost position relative to the bicycle frame, and at least one smaller sprocket arranged laterally inwardly of the larger sprocket. In such a chainwheel, the larger sprocket provides a higher speed, as opposed to the multiple freewheel wherein a larger sprocket provides a lower speed. For conducting a speed change at the chainwheel, use is made of a front derailleur which is located adjacent to the chainwheel in a forwardly moving path of the chain. When the front derailleur is laterally moved relative to the chainwheel, the chain is laterally pressed to shift from the larger sprocket to the smaller sprocket or vice versa.

To explain the disadvantages of a prior art multiple chainwheel, reference is now made to FIGS. 7 and 8 of the accompanying drawings which show a typical multiple chainwheel.

As shown in FIGS. 7 and 8, the prior art multiple chainwheel CW' comprises a larger sprocket 1', and a smaller sprocket 2' coaxial with the larger sprocket. The larger sprocket usually has a plurality of equiangularly spaced openings 3' which provide weight reduction of the chainwheel as a whole in addition to increasing visual attractiveness. The weight reduction openings should be as large as possible on the condition that the larger sprocket can meet strength requirements. Thus, each weight reduction opening 3' should have a radially outer margin 31 located as maximally close to the outer circumference of the larger sprocket 1'. The smaller sprocket 2' may similarly have weight reduction openings.

With the arrangement described above, when there is a great diametrical difference between the two sprockets 1', 2', the outer margin 31 of each weight reduction opening 3' of the larger sprocket is located considerably away from the outer circumference of the smaller sprocket, forming a relatively large radial clearance H between the opening outer margin 31 and the outer circumference of the smaller sprocket. This radial clearance may give rise to a serious problem in conducting speed change, as described below.

When shifting a chain C' (see FIG. 8) from the larger sprocket 1' to the smaller sprocket 2', the chain is laterally pressed inward by an unillustrated front derailleur, causing the chain to start disengaging from the larger sprocket from a specific circumferential point thereof. Since the chain is always subjected to driving tension, the thus disengaged chain extends substantially horizontal for shifted tangential engagement with the smaller sprocket 2', as shown in FIG. 8.

If the large radial clearance H at any weight reduction opening 3' of the larger sprocket coincides in position with the horizontally disengaging chain C', the chain may move laterally into that particular clearance or opening. As a result, the chain may fall between the two sprockets, and get firmly trapped there by large tension applied to the chain. Upon further rotation of the chainwheel, the chain thus unnaturally trapped may damage the chainwheel or the front derailleur.

One conceivable way to solve the above problem is to reduce the size of each weight reduction opening 3' of the larger sprocket 1' to such a degree that no radial clearance H is formed. However, this solution is not readily applicable because of unacceptable weight increase and appearance deterioration.

Another possible solution to solve the problem of the prior art is to reduce axial or lateral spacing between the two sprockets 1', 2' to the degree of prohibiting chain trapping therebetween. However, this solution gives rise to a new problem that the chain is likely to be overshifted beyond the smaller sprocket, thus completely coming out of driving engagement with the chainwheel.

SUMMARY OF THE INVENTION

It is therefore a main object of the present invention to provide a multiple chainwheel which provides smooth chain shifting from a larger sprocket to a smaller sprocket.

Another object of the present invention to fulfill the main object without much increasing the overall weight of the chainwheel and reducing the visual attractiveness thereof.

A further object of the present invention is to fulfill the main object without adversely affecting the chain shiftability from the smaller sprocket to the larger sprocket.

According to the present invention, there is provided a bicycle multiple chainwheel mounted on a pedalling crank assembly, the crank assembly comprising a pair of crank arms connected to a crank shaft, the chainwheel being held in driving engagement with a chain and comprising: a larger sprocket mounted on the crank assembly coaxially with the crank shaft; and at least one smaller sprocket mounted on the crank assembly coaxially with the crank shaft in side-by-side relation with the larger sprocket; wherein the larger sprocket is formed with local chain guide means which is located at a position or positions effective for preventing the chain from being trapped in an axial gap between the larger and smaller sprockets only when, in shifting the chain from the larger sprocket to the smaller sprocket, the chain starts disengaging from the larger sprocket at or adjacent a circumferential position thereof arranged on a diametrical line extending along the crank arms.

The present invention defined above is based on the knowledge that the chain normally starts disengaging from the larger sprocket only at a specific circumferential position thereof. Thus, the local chain guide means need be provided only at a position or positions suitable for guiding the thus disengaging chain onto the smaller sprocket. Such chain guide means, because of the locality of provision, does not add much to the overall weight of the chainwheel, nor detract much from the visual attractiveness of the chainwheel.

Other objects, features and advantages of the present invention will become apparent from the following detailed description of the preferred embodiments given with reference to the accompanying drawings.

BRIEF DESCRIPTION OF THE DRAWINGS

The present invention will be more fully understood from the detailed description given on the basis of the accompanying drawings, wherein.

DETAILED DESCRIPTION OF THE PREFERRED EMBODIMENTS

Figure 1:
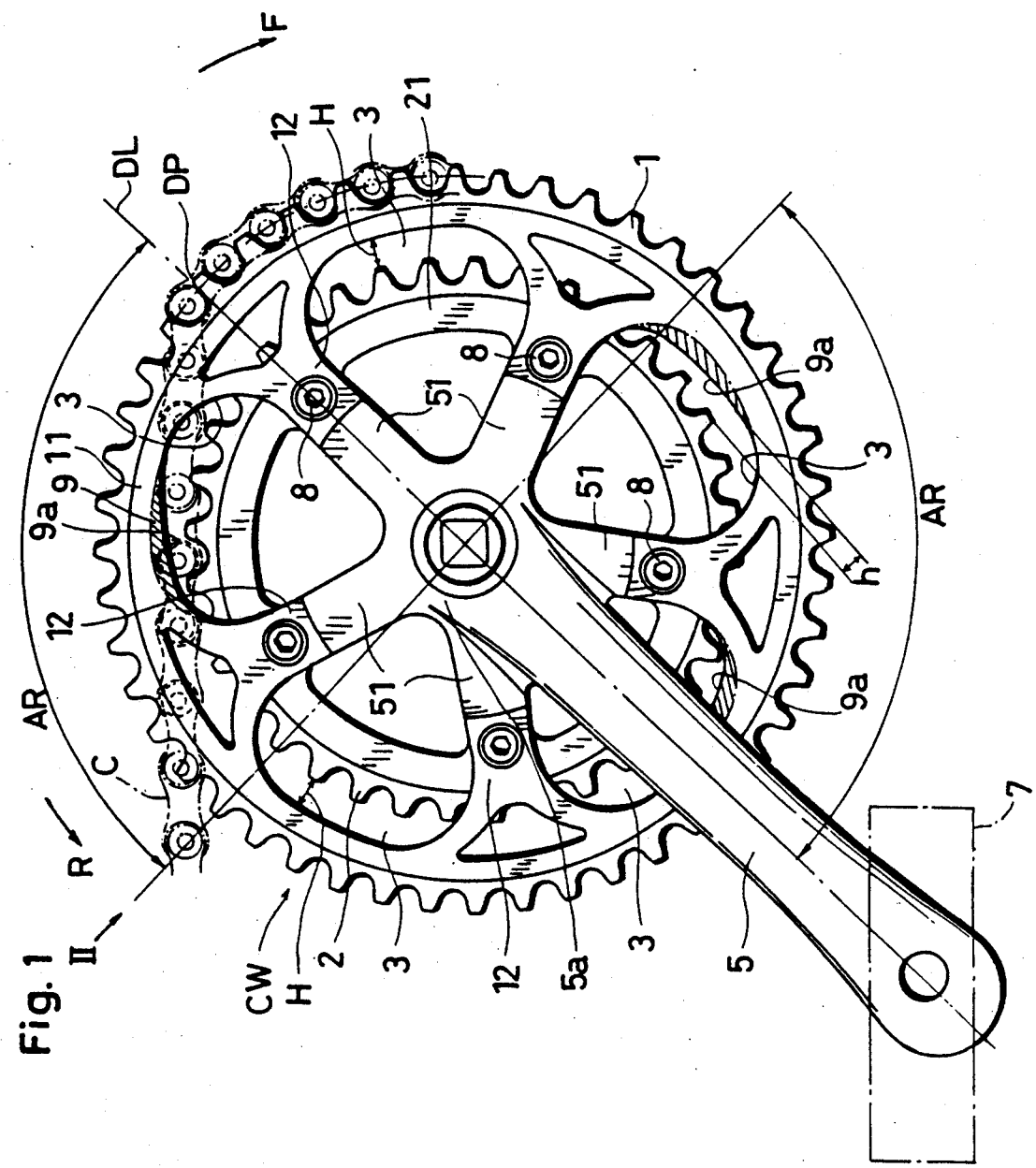
FIG. 1 is a side view showing a multiple chainwheel embodying the invention.
Figure 2:
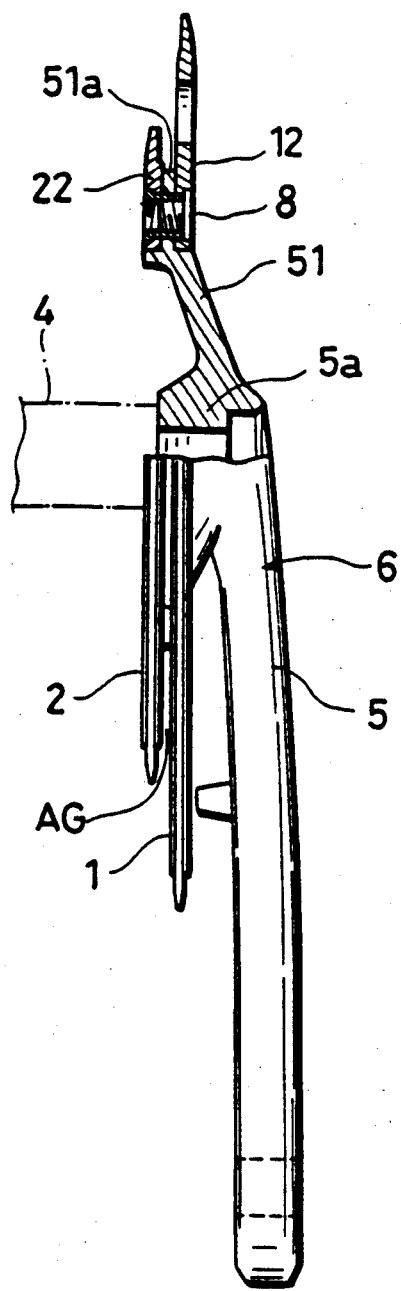
FIG. 2 is a view, partially in section, of the same chainwheel as seen in the direction of an arrow II in FIG. 1.

Referring now to FIGS. 1 and 2 of the accompanying drawings, there is illustrated a multiple chainwheel CW comprising a larger sprocket 1, and a smaller sprocket 2 arranged laterally inwardly of the larger sprocket. The illustrated chainwheel is a double or two-stage chainwheel. Of course, there may be further provided an additional smaller sprocket or sprockets (not shown) of progressively decreasing diameter to constitute a multiple chainwheel having three or more sprockets in total.

The illustrated chainwheel CW is mounted on a pedalling crank assembly 6 which includes a crank shaft 4 and a pair of crank arms 5 (only one shown in FIGS. 1 and 2, and both shown in FIGS. 3 and 4) respectively connected to both ends of the crank shaft. Specifically, the chainwheel is mounted on one crank arm which is located on the right as viewed in the forward running direction of the bicycle. Each crank arm carries a pedal 7 for rotating the chainwheel with the crank assembly. Though not illustrated, the crank shaft 4 is rotatably received in the bottom bracket lug of the bicycle frame.

The sprocket carrying crank arm (right crank arm) 5 has a base portion 5a which is integrally formed with a plurality (five for example) of outward webs 51 extending radially from the base portion. Each support arm has mounting tip 51a, as shown in FIG. 2.

The larger sprocket 1 of the chainwheel has a tooth carrying ring 11, and a plurality (five in the illustrated embodiment) of equiangularly spaced inward webs 12 extending radially from the tooth carrying ring. Each inward web is located laterally outwardly of the mounting tip 51a of a corresponding crank outer web 51 (see FIG. 2), and fixed thereto by means of a bolt 8. As a result of such an arrangement, the illustrated larger sprocket is made to have five weight reduction openings 3 each defined by the tooth carrying ring 11, two adjacent inward webs 12, and two adjacent crank outer webs 51.

The illustrated smaller sprocket 2 similarly has a tooth carrying ring 21, and five equiangularly spaced inward webs 22 (see FIG. 2) extending radially from the tooth carrying ring. Each inward web of the smaller spsrocket is located laterally inwardly of the mounting tip 51a of a corresponding crank outer web 51, and fixed thereto by means of the bolt 8 which is also used to fix the larger sprocket 1.

In FIG. 1, the larger sprocket 1 is shown as being held in engagement with a chain C which, however, has already started disengaging from the larger sprocket for shifted engagement with the smaller sprocket 2. At this time, the chain is acted upon by a laterally moving front derailleur FD (see FIG. 3 or 4).

According to the present invention, the larger sprocket 1 is designed to have local chain guide portions 9 only in two specific angular regions AR which are diametrically opposite. Each of these angular regions starts from a diametrical line DL extending along the crank arms 5, and covers 90° in a rearward rotational direction (non-driving rotational direction) R of the larger sprocket 1. Each chain guide portion 9 serves to prevent the shiftingly disengaged chain C from being trapped in an axial gap AG between the two sprockets 1, 2.

According to the embodiment shown in FIGS. 1 and 2, the tooth carrying ring 11 of the larger sprocket 1 has radially inwardly displaced inner margins 9a only at those weight reduction openings 3 which are wholly or substantially contained in the above-mentioned angular regions AR. The displaced inner margins 9a serve as the chain guide portions 9 (chain guide inner margins) which are hatched in FIG. 1 only for highlighting these portions and for indicating the degree of radial displacement as compared with the other normal inner margins.

As illustrated in FIG. 1, each chain guide inner margin 9a of the larger sprocket ring 11 may be designed to progressively become radially closer to the outer circumference of the smaller sprocket 2 as it extends circumferentially away from the diametrical line DL. As a result, the larger sprocket ring 11 is rendered progressively wider along the displaced inner margin, and a progressively narrowing radial clearance h is formed between the displaced inner margin and the outer circumference of the smaller sprocket. By contrast, the larger sprocket ring has a substantially constant width along each normal non-displaced inner margin to provide a substantially constant radial clearance H along the outer circumference of the smaller sprocket 2. Obviously, the constant clearance H is wider than the narrowing clearance h as a whole.

The narrowing clearance h effectively prevents the chain C from laterally entering thereinto when disengaging from the larger sprocket 1, as more specifically described hereinafter. It should be appreciated here that the chain guide inner margin 9a, because of only small inward displacement, does not add much to the overall weight of the larger sprocket 1, nor detract much from the visual attractiveness provided by the weight reduction openings 3.

Each of the above-mentioned angular regions AR is selected for the following reasons.

When shifting the chain C from the larger sprocket 1 to the smaller sprocket 2, the front derailleur FD (see FIG. 3 or 4), which is arranged adjacent the chainwheel CW in a forward path of the chain, must be laterally displaced from the larger sprocket position to the smaller sprocket position. However, since the chain is repetitively subjected to large forces during pedalling, it is difficult to laterally displace the front derailleur FD when such a large force is exerted on the chain.

Figure 3:
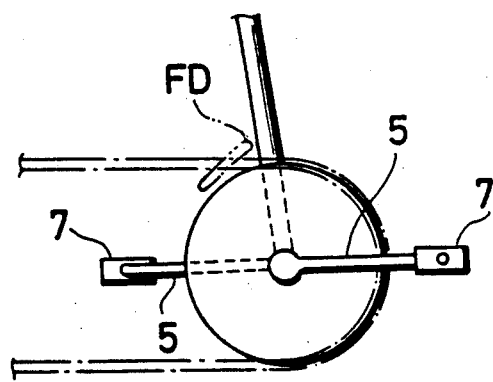
FIG. 3 is a schematic side view showing an operation of chain shifting at the time of the chain being subjected to a maximum tension.
Figure 4:
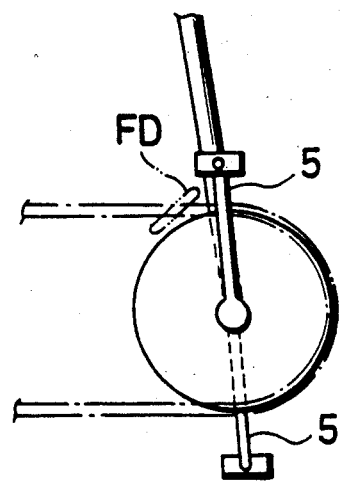
FIG. 4 is a schematic side view showing the chain shifting operation at the time of the chain being subjected to a minimum tension.

In reality, the tension applied to the chain C in the forward path thereof varies repetitively between a maximum and a minimum, as the chainwheel CW is rotated in a forward rotational direction F (see FIG. 1). As shown in FIG. 3, the chain tension becomes maximum when the crank arms 5 assume a substantially horizontal position wherein the cyclist can most effectively exerts a driving moment onto each pedal 7. On the other hand, the chain tension reduces to the minimum when the crank arms 5 are located at or adjacent the lower and upper dead points, respectively, as shown in FIG. 4.

Thus, even if the chain C is continuously subjected to a shifting force by the front derailleur FD, the chain normally starts disengaging from the larger sprocket 1 only when the chain tension becomes minimum or nearly minimum. Specifically, the chain starts disengaging from the larger sprocket at or adjacent either one of two circumferential points DP arranged on the above-mentioned diametrical line DL, as shown in FIG. 1. These circumferential or chain disengaging points correspond respectively to the upper and lower dead points of the crank arms 5.

Once the chain C thus starts disengaging from the larger sprocket the disengaging chain extends substantially horizontal from the relevant chain disengaging point DP in the rearward rotational direction of the chainwheel CW for substantially tangential engagement with the smaller sprocket 2. As apparent from FIG. 1, the disengaging chain C interferes with the larger sprocket 1 only in the relevant 90° angular region AR from the diametrical line DL.

In view of the normal chain shifting characteristic described above, the chain guide inner margins 9a need only be arranged in the respective 90° angular regions AR. Better results will be obtained if the chain guide inner margins 9a are arranged in 60° angular regions from the diametrical line DL.

In operation, a selected chain guide inner margin 9a serves to effectively guide the disengaging chain C onto the smaller sprocket 2 for shifted driving engagement therewith. Such a guiding function is provided by the fact that the radial clearance h between the displaced inner margin 9a and the outer circumference of the smaller sprocket 2 is reduced enough to prohibit the chain C from laterally entering into the relevant weight reduction opening 3, and that the chain guide inner margin is arranged in the above-mentioned 90° angular region AR. Thus, the chain is prevented from being firmly trapped in the axial gap AG between the two diametrically different sprockets. Of course, the radial width of the clearance H at each non-displaced inner margin of the larger sprocket ring 11 may be such that it allows lateral entry of the chain C into the relevant weight reduction opening.

Figure 5:
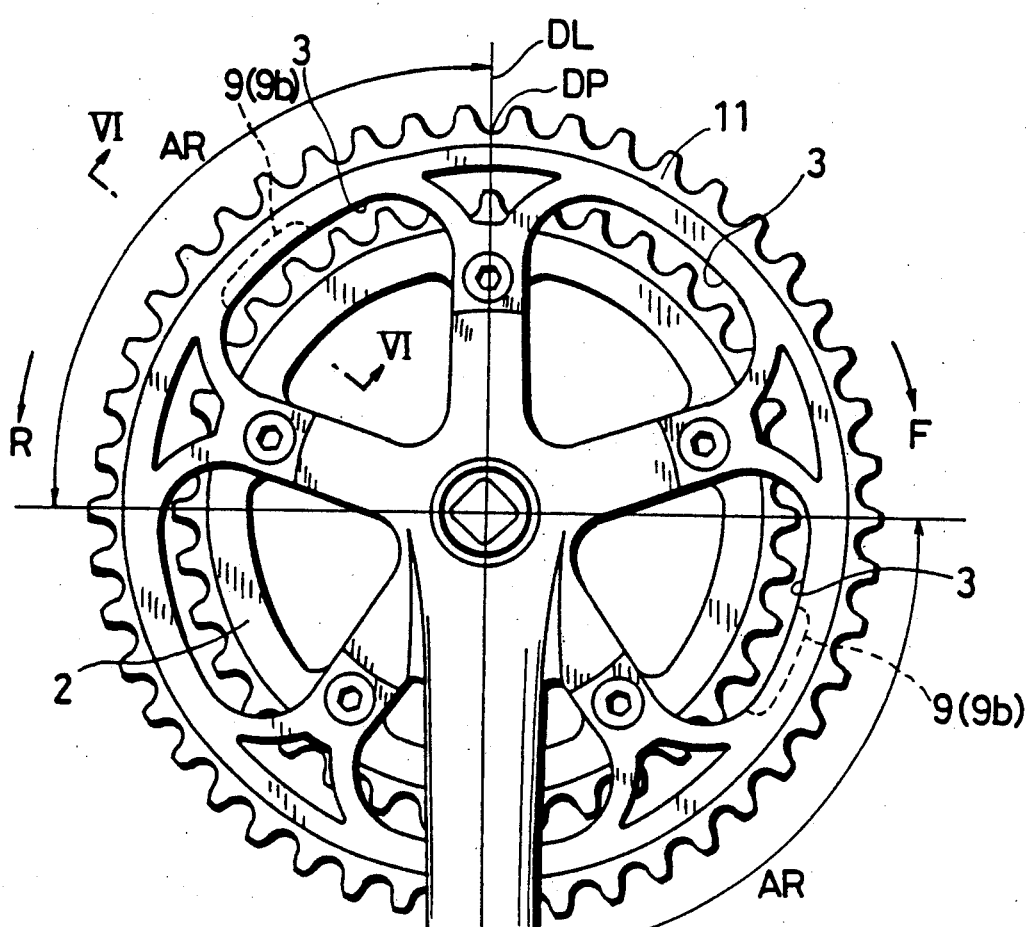
FIG. 5 is a side view similar to FIG. 1 but showing another multiple chainwheel embodying the present invention.
Figure 6:
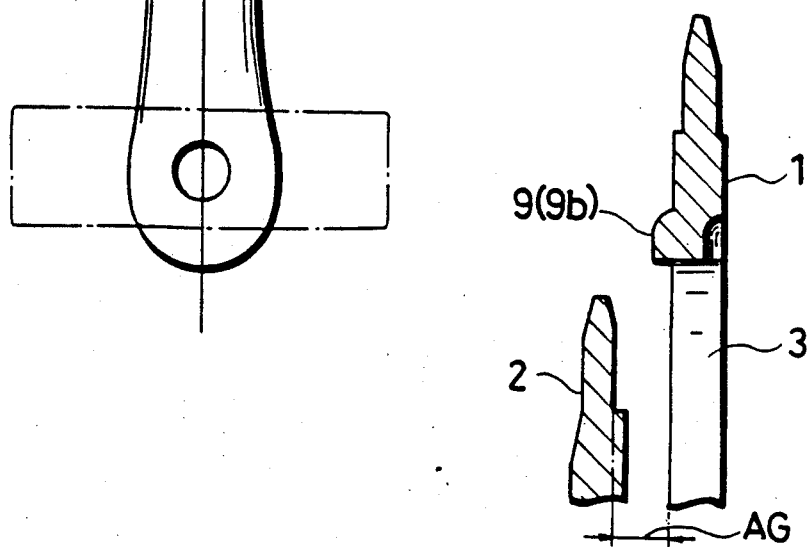
FIG. 6 is an enlarged fragmentary sectional view taken on lines VI—VI in FIG. 5.
Figure 7:
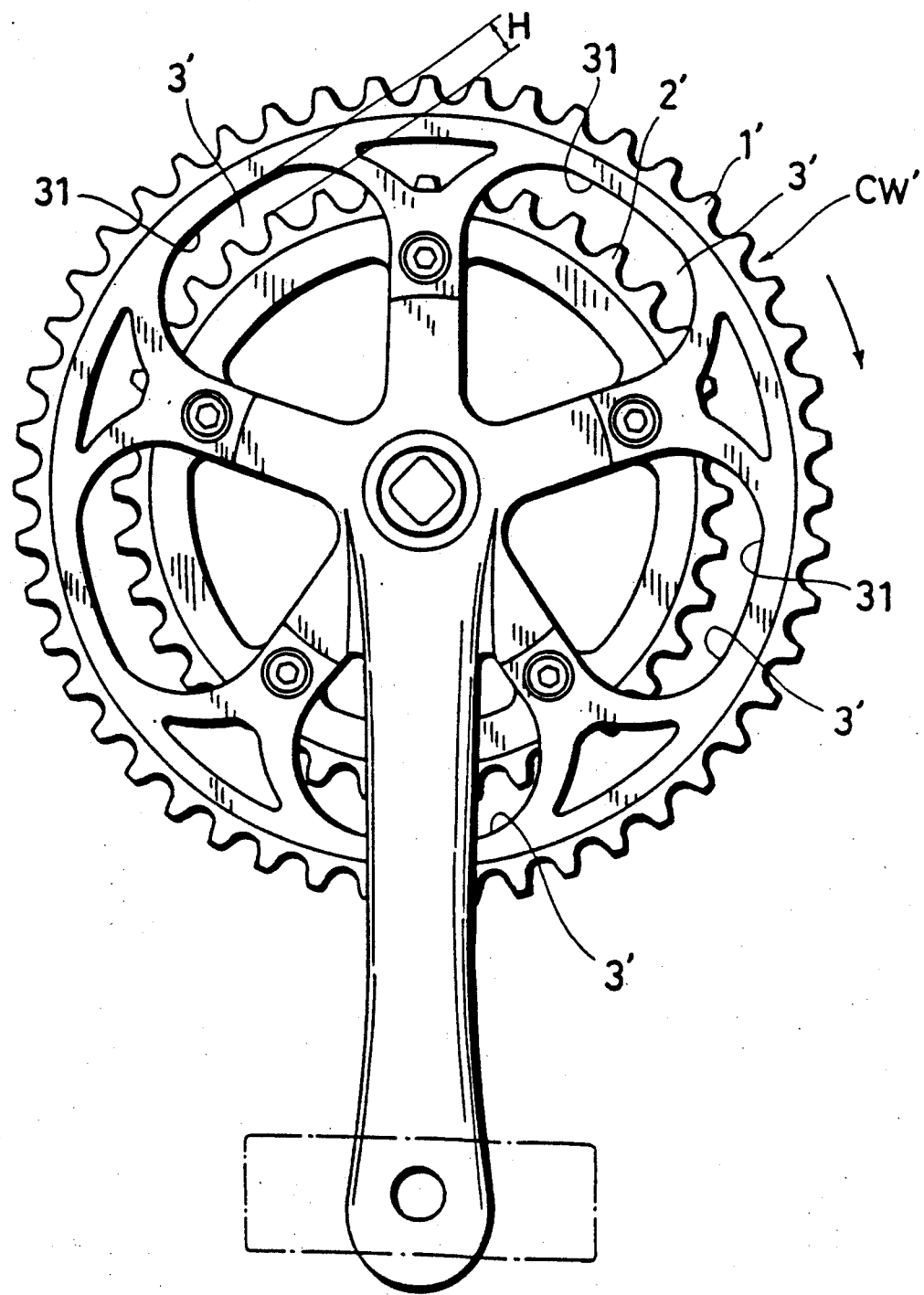
FIG. 7 is a side view similar to FIG. 1 but showing a prior art multiple chainwheel.
Figure 8:
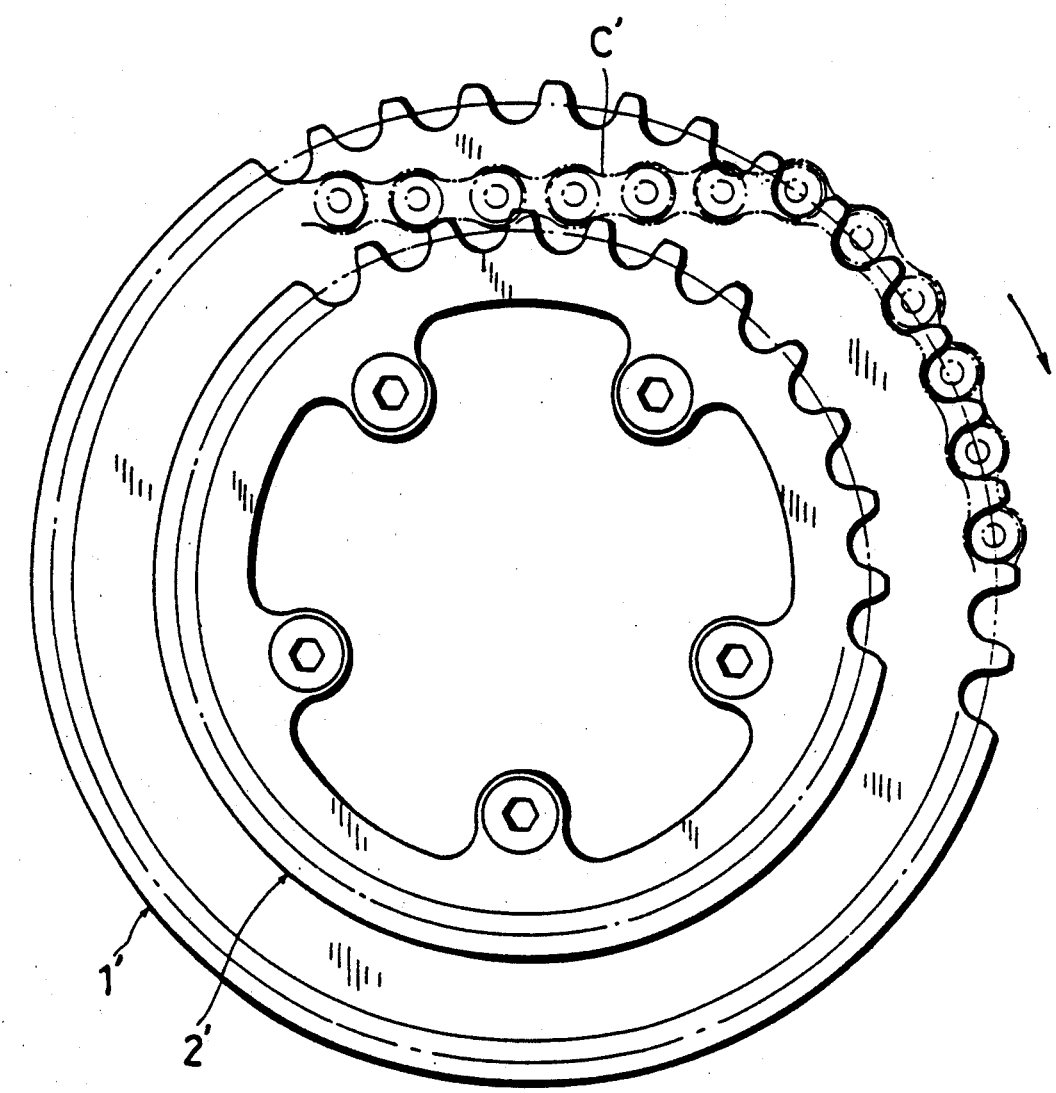
FIG. 8 is an illustrative view for showing the manner of chain shifting in the prior art chainwheel.

FIGS. 5 and 6 show a modified multiple chainwheel. This modified chainwheel is substantially the same in basic arrangement as the chainwheel of the foregoing embodiment. Therefore, those parts which are common in both embodiments are identified by the same reference numerals and letters, and not particularly described with respect to the modified embodiment to avoid duplicated explanation.

In the modification of FIGS. 5 and 6, each local chain guide portion 9 is provided in the form of a chain guide bulge 9b which is formed on a side surface of the larger sprocket ring 11 closer to the smaller sprocket 2 to adjoin a selected weight reduction opening 3. The chain guide bulge or the selected weight reduction opening is located in a 90° angular region AR which is determined as already described.

The locally formed chain guide bulge 9b serves to positively press the disengaging chain C (see FIG. 1) toward the smaller sprocket, thereby preventing the chain from being trapped between the axial gap AG (see FIG. 6) between the two sprockets 1, 2. The modified embodiment is applicable whether each radial clearance between the inner circumference of the larger sprocket ring 11 and the outer circumference of the smaller sprocket 2 is wide or narrow. Further, this embodiment is particularly advantageous when the axial gap AG between the two sprockets 1, 2 is larger than the width of the chain, because the effective width of the axial gap is reduced by the provision of the chain guide bulge 9b.

The present invention being thus described, it is obvious that the same may be varied in many ways besides the illustrated embodiments. Such variations are not to be regarded as a departure from the spirit and scope of the invention, and all such modifications as would be obvious to those skilled in the art are intended to be included within the scope of the following claims.

What is claimed is:

1. A bicycle multiple chainwheel which is drivingly rotated by a pair of pedalling crank arms, said chainwheel comprising a larger sprocket and at least one smaller sprocket coaxial with said larger sprocket, wherein:

said larger sprocket has a tooth carrying ring, said larger sprocket further having a plurality of weight reduction openings arranged at substantially equal angular spacing and partially defined by said tooth carrying ring; and said tooth carrying ring is radially wider at selected ones of said weight reduction openings than at the other weight reduction openings.

2. The chainwheel as defined in claim 1, wherein said larger sprocket provides a pair of circumferential chain disengaging points arranged on a diametrical line extending along said crank arms, and said selected weight reduction openings are wholly or substantially contained in two 90° angular ranges respectively from said chain disengaging points in a rearward rotational direction of said larger sprocket.

3. A bicycle multiple chainwheel comprising a larger sprocket and at least one smaller sprocket coaxial with said larger sprocket, wherein:

said larger sprocket has a tooth carrying ring, said larger sprocket further having a plurality of weight reduction openings arranged at substantially equal angular spacing and partially defined by said tooth carrying ring; and said tooth carrying ring has varying radial width at least at one of said weight reduction openings.

4. A bicycle multiple chainwheel mounted on a pedalling crank assembly, the crank assembly comprising a pair of crank arms connected to a crank shaft, the chainwheel being held in driving engagement with a chain and comprising:

a larger sprocket mounted on said crank assembly coaxially with said crank shaft; and at least one smaller sprocket mounted on said crank assembly coaxially with said crank shaft in side-by-side relation with said larger sprocket; wherein said larger sprocket is formed with local chain means which is located at least at one position effective for preventing said chain from being trapped in an axial gap between said larger and smaller sprockets only when, in shifting said chain from said larger sprocket to said smaller sprocket, said chain starts disengaging from said larger sprocket generally at a circumferential point thereof arranged on a diametrical line extending along said crank arms;

said chain guide means is located in an angular range of 90° starting from said circumferential point in a rearward rotational direction of said larger sprocket;

said larger sprocket has a tooth carrying ring and a plurality of equiangularly spaced inward webs extending radially from said tooth carrying ring, said tooth carrying ring providing inner margins located radially outwardly of said smaller sprocket, said inner margins together with said inner webs defining weight reduction openings; and at least one of said inner margins contained in said 90° range is located closer to said smaller sprocket than the other inner margins, thereby serving as a chain guide margin.

5. The chainwheel as defined in claim 4, wherein said local chain guide means is located in an angular range of 60° starting from said circumferential point in a rearward rotational direction of said larger sprocket.

6. The chainwheel as defined in claim 4, wherein said chain guide margin is shaped to progressively become radially closer to said smaller sprocket as said chain guide margin extends away from said circumferential chain disengaging point in said rearward rotational direction of said larger sprocket.

7. A bicycle multiple chainwheel mounted on a pedalling crank assembly, the crank assembly comprising a pair of crank arms connected to a crank shaft, the chainwheel being held in driving engagement with a chain and comprising:

a larger sprocket mounted on said crank assembly coaxially with said crank shaft, said larger sprocket having a tooth carrying ring and a plurality of equiangularly spaced inward webs extending radially form said tooth carrying ring, said tooth carrying ring providing inner margins located radially outwardly of said smaller sprocket, said inner margins together with said inner webs defining weight reduction openings; and at least one smaller sprocket mounted on said crank assembly coaxially with said crank shaft in side-by-side relation with said larger sprocket; wherein at least one of said inner margins of said larger sprocket being located in an angular range of 90° in a rearward rotational direction of said larger sprocket from a diametrical line extending along said crank arms; and said one inner margin is formed with a chain guide bulge on a side surface of said tooth carrying ring axially closer to said smaller sprocket, said chain guide bulge being elongate to extend along said one inner margin.

8. The chainwheel as defined in claim 7, wherein the chain guide bulge is integrally formed with the larger sprocket.

9. A bicycle multiple chainwheel which is drivingly rotated by a pair of pedalling crank arms, said chainwheel comprising a larger sprocket and at least one smaller sprocket coaxial with said larger sprocket, wherein:

said larger sprocket has a tooth carrying ring, said larger sprocket further having a plurality of weight reduction openings arranged at substantially equal spacing and partially defined by said tooth carrying ring; and said tooth carrying ring has a side surface facing said smaller sprocket and formed with chain guide bulges only at selected ones of said weight reduction openings, said chain guide bulges being located radially outwardly of said smaller sprocket and elongate circumferentially of said larger sprocket.

10. The chainwheel as defined in claim 9, wherein the chain guide bulge is integrally formed with the larger sprocket.

11. The chainwheel as defined in claim 9, wherein said larger sprocket provides a pair of circumferential chain disengaging points arranged generally on a diametrical line extending along said crank arms, and said selected weight reduction openings are substantially contained in two 90° angular ranges respectively from said chain disengaging points in a rearward rotational direction of said larger sprocket.

* * * * *